UNITED STATES PATENT OFFICE.

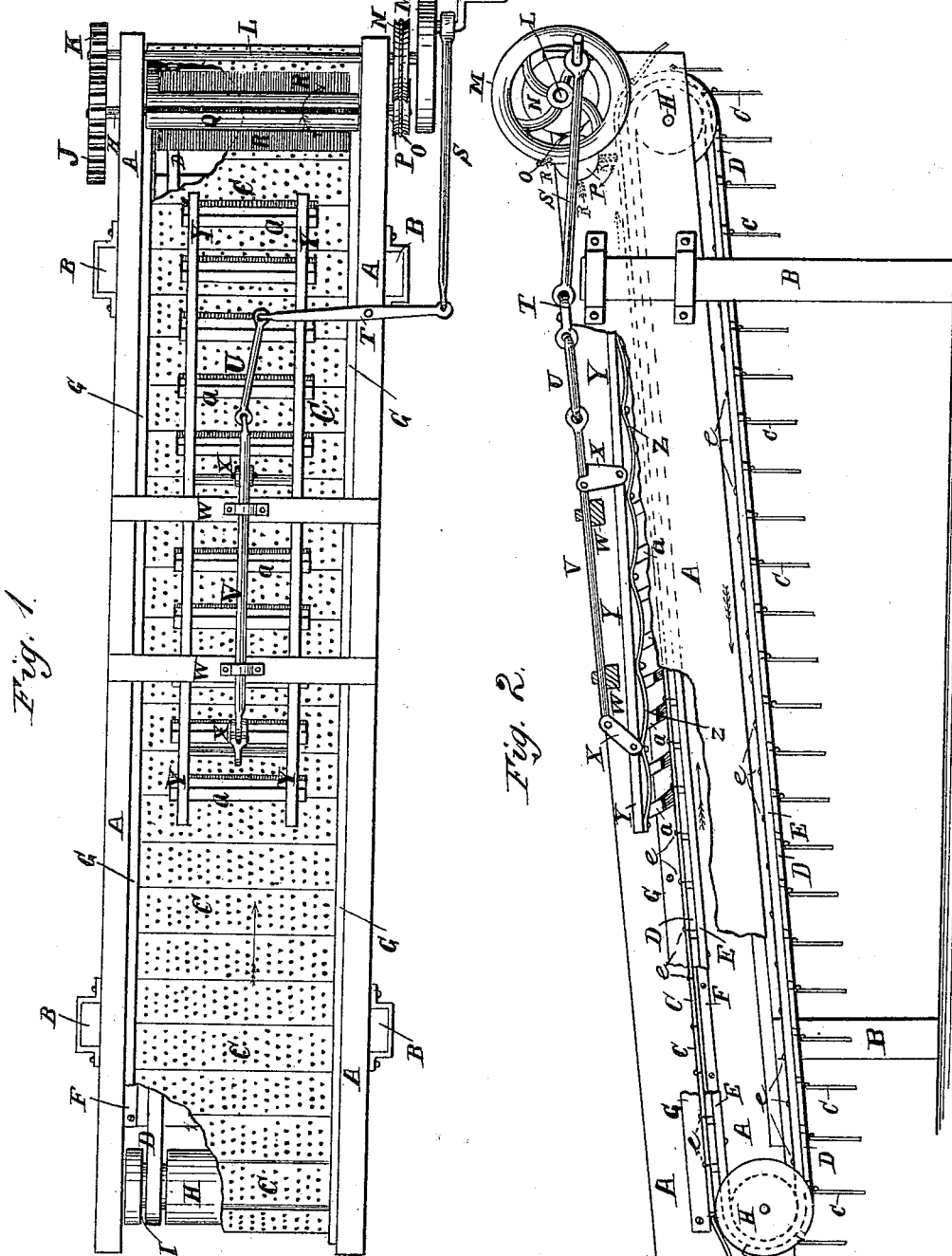

GEORGE ADAMS AND MORGAN M. JENKINS, OF SHERBURNE, MINNESOTA.

COCKLE-SEED SEPARATOR.

SPECIFICATION forming part of Letters Patent No. 271,392, dated January 30, 1883.

Application filed May 2, 1882. (No model.)

*To all whom it may concern:*

Be it known that we, GEORGE ADAMS and MORGAN MERRITT JENKINS, of Sherburne, in the county of Martin and State of Minnesota, have invented a new and useful Improvement in Cockle-Seed Separators, of which the following is a full, clear, and exact description.

Reference is to be had to the accompanying drawings, forming part of this specification, in which similar letters of reference indicate corresponding parts in both the figures.

Figure 1 is a plan view of our improvement, parts being broken away. Fig. 2 is a side elevation of the same, parts being broken away.

The object of this invention is to facilitate the separation of cockle-seed and other small seeds from wheat and other grains; and it consists in the peculiar construction and combination of parts, as hereinafter fully shown and set forth.

A represents the frame of the machine, which is set with its head end a little higher than the tail end, and is supported upon legs B, attached to its sides.

C is a series of metal plates forming an endless apron, and which are hinged at their upper edges, at a little distance from their ends, to light leather belts D. The belts D rest upon heavier belts E, and are secured to the said belts E, at points between the hinges of the plates C, by rivets e. The metal plates C have numerous recesses or indentations formed in their upper sides, each recess being made of such a size as to receive and hold a cockle-seed or other small seed. The ends of the plates C rest and slide upon cleats F, attached to the side boards of the frame A, and which are faced with metal to prevent wear.

To the side boards of the frame A, above the ends of the metal plates C, are secured strips G, of leather, to prevent any grain from working in between the ends of the plates C and the said side boards. The endless apron C D E passes around rollers H, journaled to the end parts of the frame A, and which, near their ends, have annular grooves I formed in them to receive the belts D E.

To a journal of the upper roller, H, is attached a large gear-wheel, J, the teeth of which mesh into the teeth of a smaller gear-wheel, K, attached to the end of a shaft, L. The shaft L works in bearings formed in or attached to the side boards of the frame A. To the other end of the shaft L is attached a crank-wheel, M, which is made heavy to adapt it to serve as a fly-wheel, and which serves as a pulley to receive the driving-belt when the machine is to be driven by power.

To the shaft L is attached a pulley, N, around which passes a belt, O. The belt O also passes around a smaller pulley, P, attached to a journal of the cylinder Q, journaled to the side boards of the frame A, and to which are attached six (more or less) brushes, R. The revolving of the crank-wheel M and gear K over to the left causes the gear J, drum-shaft H, and endless belts D E to revolve over to the right, while the brush R, by means of the crossed belt on pulleys N and P, revolves under to the left, as shown in dotted lines, Fig. 2.

To the crank-pin of the crank or crank-wheel M is pivoted the end of a connecting-rod, S, the other end of which is pivoted to the outer end of the lever T. The lever T is fulcrumed to the upper edge of a side board of the frame A, and to its inner end is pivoted the end of a short connecting-rod, U, the other end of which is pivoted to the end of a rod, V. The rod V slides in bearings in the upper sides of the centers of the two cross-bars W, attached to the upper edges of the side board of the frame A.

To the sliding rod V, at its lower end and near its upper end, are hinged the upper ends of two links, X, the lower ends of which are hinged to a frame, Y, so that the frame Y will be vibrated by the revolution of the driving mechanism. The sliding rod V and the links X are so arranged that the lower end of the frame Y will be raised a little from the plates C as the said frame is being moved upward.

To the frame Y are attached belts Z at regular intervals, and to the said belts, at shorter intervals, are attached brushes *a*, the backs of which are beveled, so that the said brushes will have an upward inclination, as shown in Fig. 2.

The grain is fed, through a hopper, a spout, or other suitable means, upon the plates C, between the rotary brush Q R and the upper end of the frame Y, that carries the brushes *a*, and passes down the endless apron C D E, against the direction of movement of the said endless apron, and is spread out and rubbed, during its passage, by the brushes *a*. This operation rubs and polishes the kernels of grain, and forces the cockle-seed and other small seeds into the indentations of the plates C, so that while the grain falls from the lower end of the machine into a receiver the cockle and other small seeds will be carried up by the plates C and will fall from the upper end of the machine. As the plates C pass to the upper end of the machine the rotary brush Q R brushes back any kernels of grain that may be carried up by the said plates C, so that no kernels of grain will fall from the upper end of the machine.

Having thus fully described our invention, we claim as new and desire to secure by Letters Patent—

1. A cockle-seed separator constructed substantially as herein shown and described, and consisting of the frame A, the endless chain of indented plates C, the rotary brush Q R, and the vibrating brushes Y Z *a* and their driving mechanisms, as set forth.

2. In a cockle-separator, the combination, with the frame A and the endless chain of indented plates C, of the vibrating frame Y, the straps Z, the brushes *a*, and an operating mechanism, substantially as herein shown and described, whereby the grain will be spread and polished and the small seeds pushed into the indentations of the plates C, as set forth.

3. In a cockle-separator, the combination, with the frame A, the brush-carrrying frame Y, and the drive-shaft crank-wheel M, of the lever T, the connecting-rods S U, the sliding rod V, and the links X, substantially as herein shown and described, whereby the said brush-carrying frame will be vibrated by the revolution of the said crank-wheel, as set forth.

4. In a cockle-separator, the combination, with the frame A, the endless chain of indented plates C, and the drive-shaft L, of the rotary brush Q R and the pulleys and belt N P O, substantially as herein shown and described, whereby the said indented plates will be brushed in an opposite direction from their movement, as set forth.

GEORGE ADAMS.
MORGAN MERRITT JENKINS.

Witnesses:
T. L. RECORDS,
JOHN D. YOUNG.